Feb. 18, 1936. E. J. W. RAGSDALE 2,031,428
BOAT HULL STRUCTURE
Filed May 12, 1932
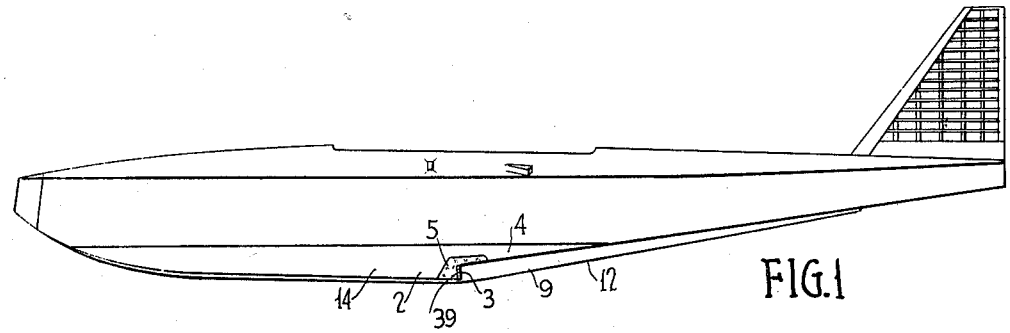
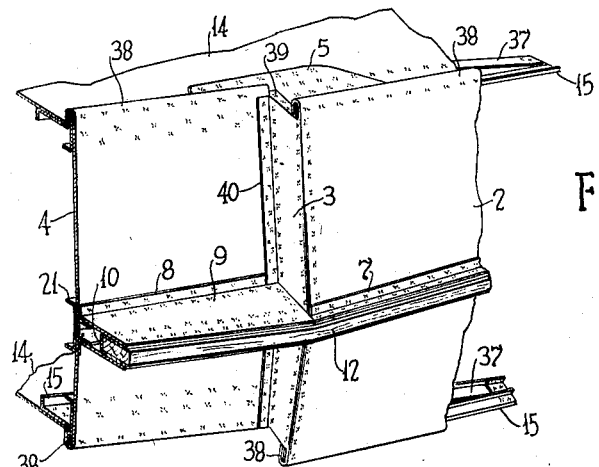
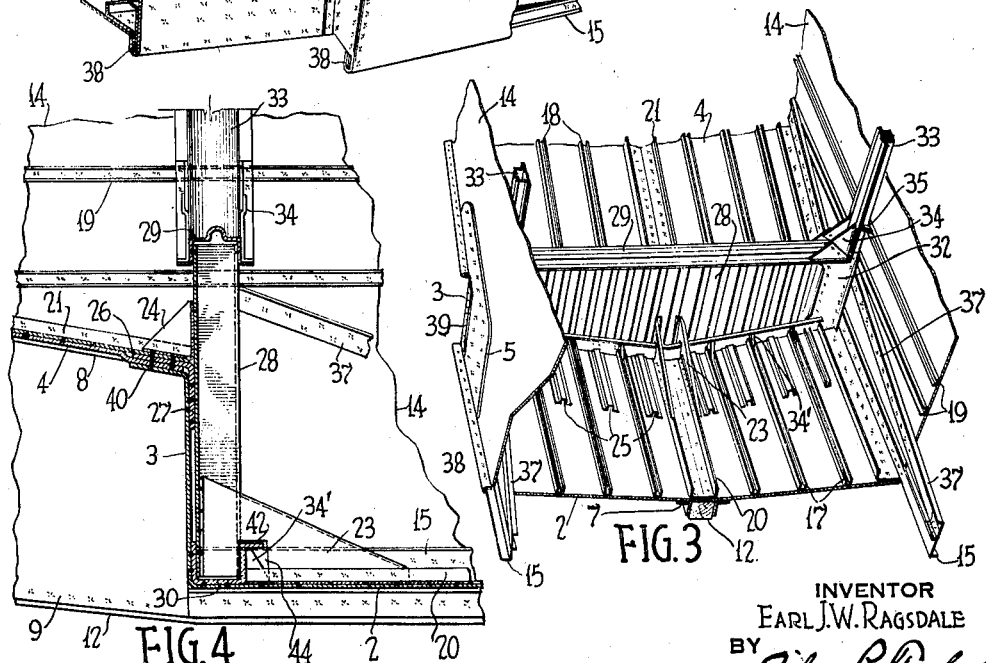
INVENTOR
Earl J. W. Ragsdale
BY
John P. Tarbox
ATTORNEY Patented Feb. 18, 1936

2,031,428

UNITED STATES PATENT OFFICE 2,031,428

BOAT HULL STRUCTURE

Earl J. W. Ragsdale, Norristown, Pa., assignor to Edward G. Budd Manufacturing Company, Philadelphia, Pa., a corporation of Pennsylvania Application May 12, 1932, Serial No. 610,783

14 Claims. (Cl. 114—66.5)

My invention relates to boat-hull structures and particularly to stream-line flying boats of the step-bottom type.

One object of my invention is to provide a step-bottom flying-boat hull that shall be of strong, light weight, hollow-shell character and constructed almost entirely of extremely thin-gauge sheet-metal, preferably of stainless steel.

Other objects include making the parts of the simplest possible form, consistent with maximum strength and facility of spot welding, causing certain parts to perform new and combined functions, rendering the device durable in construction, economical to manufacture and effective in its operation, and obtaining other advantages incident to a utilization of the improvement.

In boat hulls of the step-bottom variety, and particularly in flying boats of this type, there are extraordinary stresses imposed on the step when the boat descends to the water from the air.

At the moment of impact, practically all of the weight of the entire structure is concentrated closely adjacent to the step. The step is also subject to severe strains at other times, as when it is speeding to a rise before the lift occurs, especially in rough water.

In view of these considerations, the likelihood of damage causing leakage, danger of damage to the stream-line contour of the hull and other factors, the construction of a flying boat of this character at the step is of vital importance.

It is also necessary that the step structure be strong to resist stresses between it and other parts when the step is assuming the major weight.

In practicing my invention, I provide a step-bottom flying boat that not only resists the above-mentioned impact, weight and other forces but does so by practically the sole use of extremely thin-gauge sheet-metal; the only departure from such structure residing in a light-weight wood keel member.

The sheet-metal employed is stainless steel, to resist oxidation, to facilitate welding, stamping, cutting and other manufacturing operations, to provide durability and tensile strength with light weight, and is constructed in view of the cooperative relation of each of its parts to permit the same to be spot welded together. That is, it is not merely my purpose to employ stainless steel to facilitate welding of any sort but to employ thin-gauge sheet-stainless-steel and to shape and position the parts so that spot welding electrodes may be advantageously employed; spot welding being probably the best and most economical method of attaching metal parts to each other.

Thus, the structure, although consisting of a number of small portions of various shapes intersecting each other at various angles, is of very strong light-weight hollow-shell character in one homogeneously-integral piece.

Salient features of the device include a beam having the double function of a bulkhead and a reinforcement of the step riser, certain bracing means between the beam and one or both of the upper and lower steps, diagonal longitudinal stringers or braces between the beam and one of the steps, reinforcement of various angularly related parts between the riser and the steps, and other elements in combination and for the purposes specified, as will herein appear.

Figure 1, of the accompanying drawing, is a view, in side elevation, of a flying boat of the step-bottom variety, embodying my invention, Figure 2 is an enlarged fragmentary perspective view of a portion of the mid-section of the boat of Fig. 1, as viewed from beneath, Figure 3 is a perspective view, from above, of the section shown in Fig. 2, and Figure 4 is a further enlarged side view, partially in elevation and partially in longitudinal central section, of the portion shown in Figs. 2 and 3.

The mid or step section of the boat, to which my invention particularly relates, comprises bottom sheathing in the form of a forward lower step 2, a riser 3, an upper rear step 4, exterior side plates 5, exterior longitudinal keel elements 7 and 8 of L-section, keel plates 9, a keel channel section 10, a wood keel member 12, side panels 14, edge stringers 15 of Z-section, bottom stringers 17 and 18 of channel section on the lower and upper steps, respectively, side stringers 19, of channel section longitudinal interior center members 20 and 21 of channel section on the lower and upper steps, respectively, gussets 23 and 24 subtending the angles between the riser and the lower and upper steps, respectively, reinforcing elements 25 between the bottom stringers, an angle plate having portions 26 and 27, a combined bulkhead and step-reinforcing beam comprising a body 28, upper and lower channel-section edge liners 29 and 30, end plates 32, box-section upright side frames 33 and gussets 34 between the upper-edge channel section 29 and the box-section frames 33, smaller gussets 34' between the bottom-edge channel section 30 and the bottom stringers 17, similar small gussets 35 between the box section frames 33 and the side stringers 19 and diagonal side stringers 37 of L-section extending from positions adjacent to the riser above the bottom step to positions adjacent to said step along the side panels.

In the above-recited structure, the fore-and-aft Z-section edge stringers 15 which end at the riser 3, receive the side and bottom panels with the usual edge crimps 38. However, there being no Z-section element along the riser 3, the exterior side plates 5 are substituted therefor. The plates 5 bridge the riser between the lower and upper steps, in profile conformity thereto, and are secured to the side panels 14 by spot welding. The riser has end flanges 39 bent around the plates 5 and spot welded thereto.

The riser 3 is an integral continuation of the bottom step sheathing 2, and has a flange portion 40 extending along and across the upper step 4 in spot-welded relation thereto and lateral flanges 39 overlapping the side plates 5 and spot welded thereto as clearly shown in Figures 2 and 3.

The bottom angle members 7 and 8, spot welded to the bottom sheathing, the plates 9, spot welded to the angle members 8 and to the channel section 10, provide a channel of less width than the interior channel 21 for the reception of the wood keel member 12 that is suitably secured in position, as by screws; the keel thus extending continuously across the step, having an entire bottom edge of wood and dividing the space adjacent to the riser 3 into two three-sided parts having the keel as a common side.

The main lower body part 28 of the bulkhead or beam, although, as a whole, being of thick-wall character, is actually constructed entirely of extremely thin-gauge stainless sheet steel and comprises a transversely corrugated elongated member extending across the hull. The channel-section edge liners 29 and 30 snugly fit the corrugations, like caps thereover; the sides of the channels lying in flat-plane engagement with the corrugations in spot welded attachment thereto. The lower channel liner 30 has a flat-plane side lying against the flat inner side of the riser 3 and a transverse longitudinal reinforcing flange 42 on its other side.

The lower portion of the gusset 24, the bottom of the channel section 21, the angle-plate portion 26, a portion of the upper step 4 and the flange 40 are disposed in multi-layer spot-welded relation, thus providing an exceedingly strong laminated structure at a position where stresses and shocks are severe.

The upright portion of the gusset 24, the angle-plate portion 27 and a side of the bulkhead bottom-edge liner 30 are spot welded in side-by-side engagement with the body 28, thus further reinforcing the step. The small gussets 34 are spot welded to the outer side of the bottom edge-liner channel section 30 and to the sides of the bottom-step channel section stringers 17 in which they are disposed. This structure provides resistance against shocks locally applied at the lower edge of the riser and assists in supporting the bulkhead as a whole.

The main central gussets 23 are in the form of triangular flat plates having notches 44 by which they may fit the bottom of the edge liner 30, the flange 42, the channel section 20 and sides of the corrugations of the bulkhead body 28; these gussets thus, subtending the angle between the riser and the lower step or between the bulkhead and the lower step.

The reinforcing channel sections 25 disposed midway between, and parallel to, the bottom stringer 17, extend from the lower edge-liner channel section 30 of the bulkhead to the corresponding liner of another bulkhead (not shown) and abut the upright exterior surfaces of these liners.

The bulkhead end plates 32 are disposed in parallel side engagement with, and spot welded to, the edge liner channel sides and the sides of the box-section upright frames 33.

The gussets 34 comprise fan-like half segments spot welded together in overlapping relation to each other and secured, respectively, to the upper edge liner 29 and the upright frames 33.

The diagonal side stringers or angle braces 37 subtend the angle between the riser and the lower step, and are spot welded in position between the bulkhead and the Z-section edge liners 15 at a substantial distance from the riser.

The hull sheathing is flexible and supported longitudinally, as by the stringers 17, 18 and 25, so that under the influence of reactionary external fluid pressure, such as that applied by water and wind, in response to the boat driving force, the sheathing tends to seek its form of least resistance to such pressure. In other words, the sheathing flexes laterally, between its longitudinal supports, to form longitudinal depressions or channels when the boat is being driven at predetermined speeds.

While I have shown and described a particular form of my invention, changes may be effected therein without departing from the spirit and scope thereof, as set forth in the appended claims.

What I claim is:

1. In combination, in a step-bottom boat structure, sheathing having upper and lower steps and a riser, a bulkhead in parallel inside reinforcing relation to the riser and projecting to a position thereabove, and braces subtending the angles between the bulkhead and each of the steps.

2. In combination, in a step-bottom boat structure, upper and lower steps, a riser, a side panel conforming to the steps and riser, inside chine stringers reinforcing the panel and terminating on both steps at the riser, a reinforcing plate on the panel bridging the riser between the steps and interconnecting the ends of said stringers and an additional diagonal reinforcing member extending between the riser and the chine stringer on the lower step, whereby the chine is reinforced continuously through the stepped region.

3. In combination, in a step-bottom boat structure, sheathing having upper and lower steps and a riser, and a thick hollow-shell bulkhead of vertically corrugated thin sheet-metal reinforcing the front side of the riser and secured thereto through the bottom of the corrugations.

4. In combination, in a step-bottom boat structure, upper and lower steps, a riser, a bulkhead in parallel inside reinforcing relation to the riser and including a bottom element of channel section, and a gusset between the riser and the lower step and providing a notch in which is disposed the side of said channel section farthest from the riser.

5. In combination, in a step-bottom boat structure, upper and lower steps, a riser, and a bulkhead in parallel inside reinforcing relation to the riser and including an elongated transversely corrugated sheet metal element, and longitudinal edge reinforcing members of channel section for said element embracing the corrugations thereof.

6. In combination, in a step-bottom boat structure, upper and lower steps, a riser, a bulkhead in parallel inside reinforcing relation to the riser, and reinforcing means including a member having angularly-related sections disposed, respectively, on one of said steps and on the riser between the latter and the bulkhead.

7. In combination, in a step-bottom boat structure, sheathing having upper and lower steps and a riser, and a thick hollow-shell bulkhead of thin sheet-metal including a transverse frame reinforcing the riser, and upright side frames having spaced parallel sides, said transverse frame including spaced parallel plates engaging, and secured to, said parallel sides.

8. In combination, in a step-bottom boat structure, sheathing having upper and lower steps, a riser and a bulkhead in parallel inside reinforcing relation to the riser, longitudinal chine stringers on each step ending at the bulkhead, and reinforcing means other than the sheathing interconnecting the ends of said chine stringers and arranged both inside and outside the sheathing.

9. In combination, in a step-bottom boat structure, sheathing having upper and lower steps and a riser continuous from chine to chine, a bulkhead in parallel inside reinforcing relation to the riser, main transversely spaced inwardly facing channel longitudinal stringers on each step ending at the bulkhead, and additional reinforcing stringers for one of the steps extending a limited distance longitudinally of the boat structure between the main stringers.

10. In combination, in a step-bottom boat structure, upper and lower steps, a riser, side panels conforming thereto, and stringers extending along the side panels diagonally from positions adjacent to the riser above one of said steps to positions at substantial distances along the boat from the riser.

11. In combination, in a step-bottom boat structure, sheathing having upper and lower steps and a riser and extending continuously from chine to chine, and inside longitudinal center elements of top-opening channel section secured through their bottom walls to said sheathing and extending oppositely along said steps from adjacent to said riser, and a keel structure founded on said inside channel section elements and secured thereto through the sheathing.

12. In combination, in a step-bottom boat structure, upper and lower steps, a riser, inside longitudinal center elements of top-opening channel section extending oppositely along said steps from adjacent to said riser, and parallel outside keel-plate walls of less distance apart than the sides of said center channel elements.

13. In combination, in a step-bottom boat, upper and lower step, a sheet-metal riser and a metal bulkhead of thin-sheet hollow-shell character and relatively great overall thickness having one side disposed adjacent to the inside of the riser, the bulkhead presenting a plurality of uniformly distributed areas of the thin sheet metal at its said one side to the riser that are accessible from the other side of the bulkhead for spot welding.

14. A transverse substantially rigid bulkhead structure for hollow body structures comprising a transversely extending unitarily formed sheet metal element of corrugated section having flat crests and flat troughs, and a reinforcing member for an edge of the corrugations, said member being of channel section fitted over said edge and having flat sides closely engaging and rigidly secured to said crests and troughs, respectively, in flat plane relation thereto to form a substantially rigid beam structure.

EARL J. W. RAGSDALE.